US005408753A

United States Patent [19]

Hong

[11] Patent Number: 5,408,753

[45] Date of Patent: Apr. 25, 1995

[54] PROTRACTOR WITH A ROTOR

[76] Inventor: Wong Y. Hong, 158 Jalan Dato Sulaiman, Century Garlden. Post Code 80250 Johor Baru, Johor, Malaysia

[21] Appl. No.: 200,693

[22] Filed: Feb. 23, 1994

[51] Int. Cl.[6] .......................... G01B 5/24; B43L 13/00

[52] U.S. Cl. .......................... 33/430; 33/435; 33/471; 33/562

[58] Field of Search .......................... 33/15 D, 27.03, 424, 33/425, 426, 430, 435, 471, 562, 563

[56] References Cited

U.S. PATENT DOCUMENTS

| | | | |
|---|---|---|---|
| 709,219 | 9/1902 | Hochspeier | 33/430 |
| 923,313 | 6/1909 | Anderson | 33/424 |
| 1,062,740 | 5/1913 | Sharpe | 33/471 |
| 1,665,898 | 4/1928 | Strickland | 33/471 |
| 2,299,444 | 10/1942 | Warner | 33/435 |
| 2,480,914 | 9/1949 | Gallington et al. | 33/471 |
| 3,059,339 | 10/1962 | Danforth | 33/15 D |

FOREIGN PATENT DOCUMENTS

| | | | |
|---|---|---|---|
| 551795 | 4/1923 | France | 33/471 |
| 53887 | 10/1890 | Germany | 33/426 |
| 339980 | 12/1930 | United Kingdom . | |
| 620163 | 1/1947 | United Kingdom . | |
| 589758 | 6/1947 | United Kingdom . | |
| 655224 | 7/1951 | United Kingdom . | |
| 663970 | 1/1952 | United Kingdom . | |
| 1232776 | 5/1971 | United Kingdom . | |
| 2208720 | 12/1989 | United Kingdom . | |

*Primary Examiner*—Thomas B. Will

*Attorney, Agent, or Firm*—Cushman, Darby & Cushman

[57] ABSTRACT

According to the present invention there is provided a protractor including a main body surrounding a circular aperture and having a scale of angular measurements thereon, and a rotary cursor mounted on the main body for rotary movement about the center of the circle of the circular aperture. The rotary cursor includes a part-circular center portion engaged in the circular aperture and rotatable within the aperture, and a radial arm portion extending radially outwardly from the center portion to the scale. The center portion of the rotary cursor is generally in the shape of a sector of a circular disc bounded by the reference side edge and the further side edge, and extends through about three quarters of a circle. The arm portion and the center portion of the cursor are formed as an integral unit. The lower main face of the center portion lies in substantially the same plane as the lower main face of the main body whereby when a line is drawn along a reference side edge of the center portion on paper on which the protractor is resting the reference side edge is touching or closely adjacent to the paper to minimize parallax errors.

9 Claims, 3 Drawing Sheets

PROTRACTOR WITH A ROTOR

BACKGROUND OF THE INVENTION

1. Field of the Invention

The present invention relates to a protractor designed to be used to measure and draw angles.

2. Description of the Prior Art

In U.S. Pat. No. 1,062,740 (Sharpe) there is disclosed a pocket protractor intended to occupy a minimum space. An outer ring member carries degree graduations and an intermediate ring member has a line marked to align with the graduations. The intermediate ring member rotates inside a circular aperture inside the outer ring member. A diametric crossbar is secured across the intermediate ring member and bears a bevelled side edge provided with graduations.

In German patent specification No. 53887 (Dumur) a semi-circular angular measuring device has an arm rotatable around a semi-circular scale, and has graduations marked on the arm.

SUMMARY OF INVENTION

According to the present invention there is provided a protractor comprising a main body surrounding a circular aperture, and a rotary cursor mounted on said main body for rotary movement about the centre of the circle of the circular aperture. Said main body has a scale of angular measurements thereon, and has an upper main face and a lower main face. Said rotary cursor comprises a part-circular centre portion engaged in said circular aperture and rotatable within said aperture, and a radial arm portion extending radially outwardly from said centre portion to said scale. Said radial arm portion has a reference feature which can be aligned with selected positions on the angular scale of the main body, and said centre portion has an upper main face, and a lower main face, and has a reference side edge and a further side edge. Said reference side edge extends along a radius of the circle for alignment with a side of an angle to be measured, or for indicating an angle to be marked, whereby said reference side edge can be aligned to a position related to an angle on the said scale of angular measurements. Said centre portion of said rotary cursor is generally in the shape of a sector of a circular disc bounded by said reference side edge and said further side edge, and extends around about three quarters of a circle from said reference side edge to said further side edge. Said arm portion and said centre portion of said cursor are formed as an integral unit, with said reference side edge and said further side edge fixed relative to each other, said centre portion being in engagement with the perimeter of said circular aperture along about three quarters of the perimeter of the circular aperture. Said lower main face of said centre portion lies in substantially the same plane as said lower main face of said main body whereby when a line is drawn along said reference side edge on paper on which the protractor is resting said reference side edge is touching or closely adjacent to said paper to minimize parallax errors.

BRIEF DESCRIPTION OF THE DRAWINGS

An embodiment of the invention will now be described by way of example with reference to the accompanying drawings in which.

DESCRIPTION OF THE PREFERRED EMBODIMENT

Figure 1:
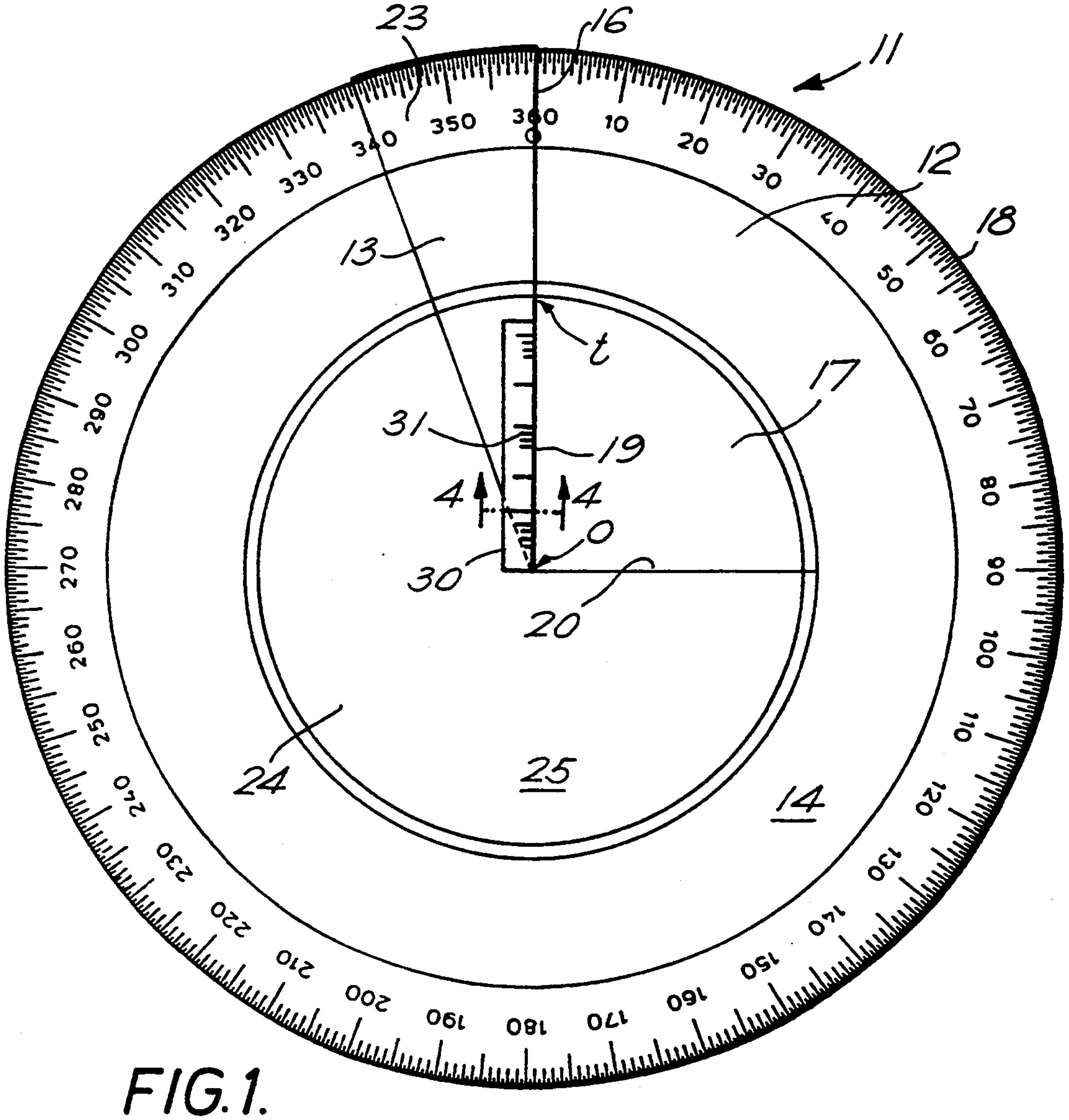
FIG. 1 is a front plan view of a protractor embodying the present invention.
Figure 2A:
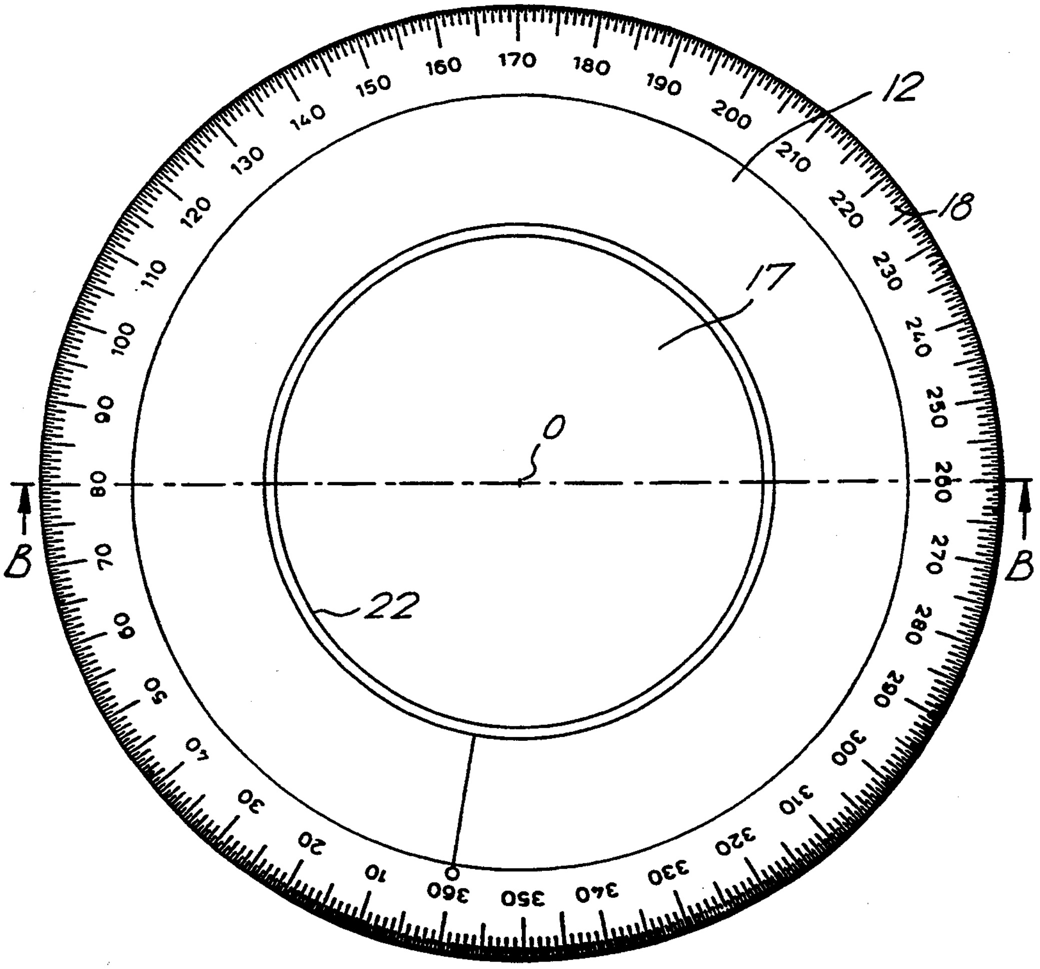
FIG. 2A is a plan view of the main body of the protractor of FIG. 1A, with a rotary cursor thereof removed.
Figure 2B:
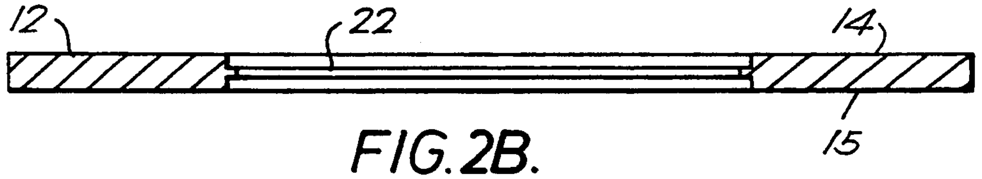
FIG. 2B is a section along the line 2B—2B in FIG. 2A.

Referring firstly to FIG. 1, there is shown a protractor 11 embodying the invention. The protractor 11 comprises a main body 12 and a rotary cursor 13. As shown in FIGS. 2A and 2B, the main body 12 surrounds a circular aperture 17 and has a scale 18 of angular measurements thereon. The main body 12 has an upper main face 14 and a lower main face 15.

Figure 3A:
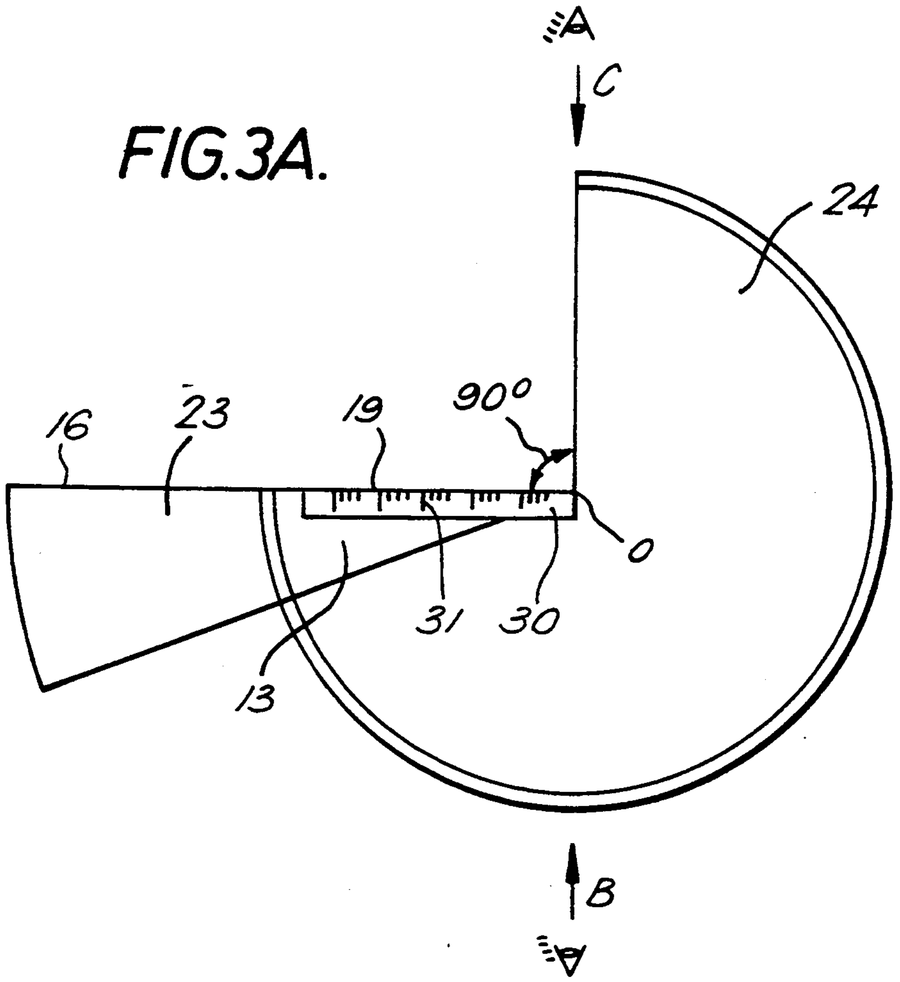
FIG. 3A is a plan view of the rotary cursor of the protractor as shown in FIG. 1.
Figure 3B:
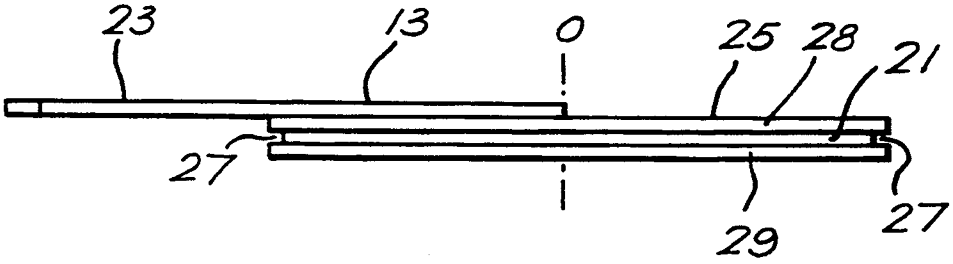
FIGS. 3B and 3C are side views of the cursor in the directions 3B and 3C in FIG. 3A.
Figure 3C:
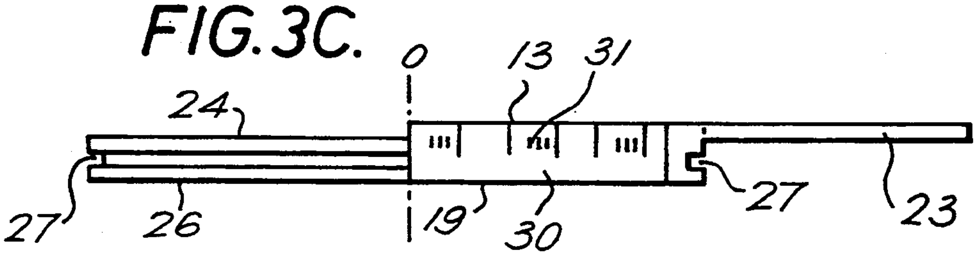

As shown in FIG. 1, the rotary cursor 13 is mounted on the main body 12 for rotary movement about the centre o of the circle of the circular aperture 17. The rotary cursor 13 comprises a part-circular centre portion 24 engaged in the circular aperture 17 and rotatable within the aperture 17, and a radial arm portion 23 extending radially outwardly from said centre portion 24 to the scale 18 on the main body 12. The radial arm portion 23 has a reference feature 16, constituted by an edge of the radial arm portion 23, which can be aligned with selected portions on the angular scale 18 of the main body 12. As shown in FIGS. 3B and 3C, the centre portion 24 has an upper main face 25 and a lower main face 26. As shown in FIGS. 1 and 3A, the centre portion has a reference side edge 19 and a further side edge 20. The reference side edge 19 extends along a radius of the circle for alignment with a side of an angle to be measured, or for indicating an angle to be marked, whereby the reference side edge 19 can be aligned to a position related to an angle on the scale 18 of angular measurements.

As shown particularly in FIGS. 3A, 3B and 3C, the centre portion 24 of the rotary cursor 13 is generally in the shape of a sector of a circular disc bounded by the reference side edge 19 and the further side edge 20, the sector extending through three quarters of a circle from the reference side edge 19 to the further side edge 20. The arm portion 23 and the centre portion 24 of the cursor 13 are formed as an integral unit with the reference edge 19 and the further side edge 20 fixed relative to each other. The centre portion 24 of the cursor 13 is in engagement with the perimeter of the circular aperture 17 along three quarters of the perimeter of the circular aperture 17.

As can be seen from comparison of FIGS. 2B, 3B and 3C, the lower main face 26 of the centre portion 24 lies in substantially the same plane as the lower main face 15 of the main body 12. The effect of this is that when a line is drawn along the reference side edge 19 on paper on which the protractor is resting, the reference side edge 19 is touching or closely adjacent to the paper to minimize parallax errors. The underside of the centre portion 24 presents a continuous surface over the lower main face 26 extending around a sector of about three quarters of a circle.

As shown in FIG. 1, the reference side edge 19 of the cursor 13 extends to and passes through the centre o of the circular aperture 17. The reference side edge 19 and the further side edge 20 are both radial side edges inclined to each other at an angle of 90°. The radial arm portion 23 of the cursor 13 has the shape of a truncated V.

As shown particularly in FIGS. 2B, 3B and 3C, the inner perimeter of the main body 12 includes a protruding flange 22 and the outer perimeter of the centre portion 24 includes an annular groove 27. When assembled, the protruding flange 22 engages the annular groove 27.

The protractor is made of plastics material. The circular scale 18 ranges from 0° to 360° in a clockwise direction, but in alternative arrangements the angular scale can be arranged in an anti-clockwise direction. The protractor is designed to be used to measure and draw angles of any value. Reference letter o indicates the centre of the protractor. In drawing an angle of a required value, the reference side edge 19 is moved until the reference feature edge 16 is aligned with the zero degree position on the scale 18, and a line is drawn along the reference side edge 19. Next the cursor 13 is moved to a new position where the reference feature 16 is aligned on the angular scale 18 to indicate the required angle in degrees, and another line is drawn along the reference side edge 19.

Figure 4:
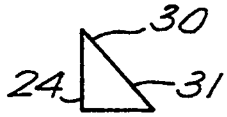
FIG. 4 is a section of part of the protractor shown in FIG. 1, taken along the line 4—4 in FIG. 1.

As shown in FIG. 1, the centre portion 24 of the rotary cursor 13 has the linear scale 31 in centimetres where the zero value in centimetres starts from the centre o of the protractor. The inclined bevel face 30 of the centre portion 24 extends from the centre 0 of the circle to a position close to the intersection of the reference edge 19 with the inner perimeter of the circular aperture 17, the intersection being indicated at t. The reference edge 19 passes through the centre o which is the centre of the protractor. As shown in FIG. 4, the bevel face 30 slopes downwardly from the upper main face 25 of the centre portion 24 to the reference side edge 19 which is at the level of the lower main face 26 of the centre portion 24. This bevel surface 30 is provided throughout the length of the linear scale 31.

FIGS. 3A, 3B and 3C show the detailed design of the centre portion 24. As shown in FIG. 3B, the radial arm 23 is at the top of the centre portion 24. The centre portion 24 is made up of an upper disc sector 28, a lower disc sector 29 and a part cylinder 21, which joins the upper disc sector 28 and the lower disc sector 29. The radial arm 23 and the upper disc sector 28 are manufactured as a single piece, and the unit is placed over the flange 22 shown in FIGS. 2A and 2B of the inner perimeter of the main body 12. The flange 22 is of less depth than the depth of the main body 12. The part cylinder 28 of the centre portion 24 is supported by the flange 22, with the part cylinder 21 extending downwardly from the upper disc sector 28. The lower disc sector 29 is then adhered to the part cylinder 21 by any suitable means. This arrangement enables the flange 22 to be fitted closely into the slot 27 formed by the three components 28, 21 and 29 as shown in FIG. 3B and 3C.

I claim:

1. A protractor comprising:

a main body surrounding a circular aperture, said main body having a scale of angular measurements thereon, and said main body having an upper main face and a lower main face; and a rotary cursor mounted on said main body for rotary movement about the centre of the circle of the circular aperture, said rotary cursor comprising a part-circular centre portion engaged in said circular aperture and rotatable within said aperture, and an arm portion extending radially outwardly from said centre portion to said scale;

said arm portion having a reference feature which can be aligned with selected positions on the angular scale of the main body, and said centre portion having an upper main face, and a lower main face, and having a reference side edge and a further side edge, said reference side edge extending along a radius of the circle for alignment with a side of an angle to be measured, or for indicating an angle to be marked, whereby said reference side edge can be aligned to a position related to an angle on the said scale of angular measurements, said centre portion of said rotary cursor being generally in the shape of a sector of a circular disc bounded by said reference side edge and said further side edge, said sector extending through about three quarters of a circle from said reference side edge to said further side edge, said arm portion and said centre portion of said cursor being formed as an integral unit with said reference side edge and said further side edge fixed relative to each other, said centre portion being in engagement with the perimeter of said circular aperture along about three quarters of the perimeter of the circular aperture;

said lower main face of said centre portion lying in substantially the same plane as said lower main face of said main body whereby when a line is drawn along said reference side edge on paper on which the protractor is resting said reference side edge is touching or closely adjacent to said paper to minimize parallax errors.

2. A protractor according to claim 1 in which the underside of said centre portion presents a continuous surface over the lower main face thereof extending around a sector of about three quarters of a circle for contacting a surface on which the protractor is resting.

3. A protractor according to claim 1 in which said reference side edge of said cursor extends to and passes through the centre of said circular aperture.

4. A protractor according to claim 3 in which said reference side edge and said further side edge are both radial side edges inclined to each other at an angle of about 90°.

5. A protractor according to claim 1 in which the radial arm portion of the cursor has the shape of a truncated V.

6. A protractor according to claim 5 in which said inner perimeter of said main body includes a protruding flange and the outer perimeter of said centre portion includes an annular groove, said protruding flange engaging said annular groove.

7. A protractor according to claim 1 in which said reference side edge of said centre portion is formed at the intersection of said lower main face of said centre portion and an inclined bevel face of said centre portion which is inclined to said upper main face of said centre portion.

8. A protractor according to claim 7 in which said inclined bevel face bears a linear measurement scale.

9. A protractor comprising:

a main body surrounding a circular aperture, said main body having a scale of angular measurements thereon, and said main body having an upper main face and a lower main face; and a rotary cursor mounted on said main body for rotary movement about the centre of the circle of the circular aperture, said rotary cursor comprising a part-circular centre portion engaged in said circular aperture and rotatable within said aperture, and an arm portion extending radially outwardly from said centre portion to said scale;

said arm portion having a reference feature which can be aligned with selected positions on the angular scale of the main body, and said centre portion having an upper main face, and a lower main face, and having a reference side edge and a further side edge, said reference side edge extending along a radius of the circle for alignment with a side of an angle to be measured, or for indicating an angle to be marked, whereby said reference side edge can be aligned to a position related to an angle on the said scale of angular measurements, said reference side edge of said centre portion being formed at the intersection of said lower main face of said centre portion and an inclined bevel face of said centre portion which is inclined to said upper main face of said centre portion, said inclined bevel face bearing a linear measurement scale, said centre portion of said rotary cursor being generally in the shape of a sector of a circular disc bounded by said reference side edge and said further side edge, said sector extending through about three quarters of a circle from said reference side edge to said further side edge, said arm portion and said centre portion of said cursor being formed as an integral unit with said reference side edge and said further side edge fixed relative to each other, said centre portion being in engagement with the perimeter of said circular aperture along about three quarters of the perimeter of the circular aperture, and the underside of said centre portion presenting a continuous surface over the lower main face thereof extending around a sector of about three quarters of a circle, for contacting a surface on which the protractor is resting;

said lower main face of said centre portion lying in the same plane as said lower main face of said main body whereby when a line is drawn along said reference side edge on paper on which the protractor is resting said reference side edge is touching said paper to minimize parallax errors.

* * * * *

UNITED STATES PATENT AND TRADEMARK OFFICE
CERTIFICATE OF CORRECTION

PATENT NO. : 5,408,753

DATED : APRIL 25, 1995

INVENTOR(S) : YIN HONG WONG

It is certified that error appears in the above-identified patent and that said Letters Patent is hereby corrected as shown below:

On the title page item

"[76] Inventor: WONG Y. HONG, 158. . .Malaysia"

to

-[76] Inventor: <u>YIN HONG WONG</u>, 158. . .Malaysia-.

Signed and Sealed this

Fourth Day of July, 1995

Attest:

BRUCE LEHMAN

*Attesting Officer*

*Commissioner of Patents and Trademarks*